United States Patent
Xiong

(10) Patent No.: US 9,237,621 B1
(45) Date of Patent: Jan. 12, 2016

(54) CURRENT CONTROL CIRCUIT AND METHOD FOR FLOATING IC DRIVEN BUCK-BOOST CONVERTER

(71) Applicant: Universal Lighting Technologies, Inc., Madison, TN (US)

(72) Inventor: Wei Xiong, Madison, TN (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 14/589,000

(22) Filed: Jan. 5, 2015

Related U.S. Application Data

(60) Provisional application No. 62/040,466, filed on Aug. 22, 2014.

(51) Int. Cl.
*H05B 37/02* (2006.01)
*H05B 33/08* (2006.01)

(52) U.S. Cl.
CPC ........ *H05B 33/0851* (2013.01); *H05B 33/0815* (2013.01)

(58) Field of Classification Search
None
See application file for complete search history.

(56) References Cited

U.S. PATENT DOCUMENTS

| | | | | |
|---|---|---|---|---|
| 6,344,717 B1* | 2/2002 | Lestician | ............. | H05B 1/2925 315/209 R |
| 2007/0040516 A1* | 2/2007 | Chen | ................... | H05B 39/045 315/291 |
| 2008/0018261 A1* | 1/2008 | Kastner | ................... | F21V 23/00 315/192 |
| 2008/0224636 A1* | 9/2008 | Melanson | .......... | H05B 33/0815 315/307 |
| 2009/0273297 A1* | 11/2009 | Kelly | ................. | H02M 1/4225 315/247 |
| 2010/0026208 A1* | 2/2010 | Shteynberg | ........ | H05B 33/0815 315/297 |
| 2011/0068703 A1* | 3/2011 | McKinney | ......... | H05B 33/0815 315/210 |
| 2011/0175543 A1* | 7/2011 | Sun | ..................... | H05B 33/0818 315/291 |
| 2011/0227492 A1* | 9/2011 | Du | ...................... | H05B 33/0848 315/186 |
| 2012/0146545 A1* | 6/2012 | Nerone | ............. | H02M 3/33523 315/297 |
| 2012/0200230 A1* | 8/2012 | Esaki | ................. | H05B 33/0851 315/200 R |
| 2012/0206064 A1* | 8/2012 | Archenhold | ....... | H05B 33/0812 315/297 |
| 2012/0229044 A1* | 9/2012 | Nerone | ............. | H05B 33/0815 315/210 |
| 2012/0286696 A1* | 11/2012 | Ghanem | ............ | H05B 33/0815 315/291 |
| 2013/0099691 A1* | 4/2013 | Esaki | ................. | H05B 33/0815 315/210 |
| 2013/0127353 A1* | 5/2013 | Athalye | ............. | H05B 33/0815 315/193 |
| 2013/0300310 A1* | 11/2013 | Hu | ..................... | H05B 33/0854 315/239 |
| 2014/0159608 A1* | 6/2014 | Simi | .................. | H05B 33/0815 315/205 |
| 2014/0239810 A1* | 8/2014 | Martin-Lopez | ........ | H05B 37/02 315/85 |
| 2014/0265900 A1* | 9/2014 | Sadwick | ............ | H05B 33/0803 315/200 R |
| 2015/0173145 A1* | 6/2015 | Lee | .................... | H05B 33/0845 315/200 R |

* cited by examiner

*Primary Examiner* — Crystal L Hammond
(74) *Attorney, Agent, or Firm* — Patterson Intellectual Property Law, P.C.; Mark J. Patterson; Gary L. Montle

(57) ABSTRACT

A buck-boost LED driver circuit is provided with floating IC driving control. A DC power supply is provided with first and second inputs, the second input coupled to a mains ground. A PFC switching circuit is coupled to the first input and operable to drive an LED load. A current sensor is coupled to the switching circuit and configured to provide feedback signals representative of current through the LED load, and a dimming control circuit is coupled to the mains circuit ground and effectively superposes an external dimming control signal with the load feedback signal. A PFC controller is configured to provide driver signals to a switching element based on the superposed dimming and load feedback signals as compared to an internal reference. Each of the switching element, the current sensor and the controller are commonly coupled to a floating circuit ground.

20 Claims, 4 Drawing Sheets

CURRENT CONTROL CIRCUIT AND METHOD FOR FLOATING IC DRIVEN BUCK-BOOST CONVERTER

CROSS-REFERENCES TO RELATED APPLICATIONS

This application claims benefit of U.S. Provisional Patent Application No. 62/040,466, filed Aug. 22, 2014, and which is hereby incorporated by reference.

A portion of the invention of this patent document contains material that is subject to copyright protection. The copyright owner has no objection to the reproduction of the patent document or the patent invention, as it appears in the U.S. Patent and Trademark Office patent file or records, but otherwise reserves all copyright rights whatsoever.

BACKGROUND OF THE INVENTION

The present invention relates generally to power converters for lighting control systems. More particularly, the invention as disclosed herein relates to dimming current control for high power factor, constant current buck-boost converters.

Buck-boost converters are conventionally very good candidates for use with wide range input voltage (120-277V), high power factor non-isolated constant current LED drivers. Such converters are relatively low cost and compact in nature. A typical topology, as represented for example in FIG. 1, has a drawback in that the output does not share the same ground as the control IC. This makes the current control very complicated.

For a conventional LED driver circuit 10 as shown in FIG. 1, V1 is the input AC source. L1 is a common mode inductor for electromagnetic interference (EMI). Capacitor C1 is an EMI filter capacitor. Inductor L2 is a differential EMI inductor. Diodes D1-D4 are input rectifier diodes for converting the AC input supply to a DC power supply. Capacitor C2 is a high frequency filter capacitor for the converter. Resistors R1 and R2 define a voltage divider coupled across filtering capacitor C2. Inductor L3 is a buck-boost inductor that stores that energy and releases it according to the control of IC. MOSFET Switch Q1 is a switching element that is controlled by driver signals generated from the IC. Diode D5 is a rectifier diode that bypasses the current from the primary winding $L3_p$ of the buck-boost inductor to output capacitor C4 when the switching element Q1 is off.

The controller IC as shown in FIG. 1 typically can be a power factor control (PFC) controller IC as is known in the art, such as for example the L6562 offered by STMicroelectronics. The controller IC has a MULT pin that senses the input line signal via a node between the voltage dividing resistors R1 and R2. The controller IC also has a zero current detection (ZCD) pin that is coupled to a secondary winding $L3_s$ of the buck-boost inductor via resistor R3, wherein the controller IC may ensure transition mode operation by controlling the turn on time of the switching element Q1. The controller IC also has an $I_{sense}$ pin that senses the current going through the switching element Q1 and resistor R5. The controller IC further includes an internal op amp with a $V_{sense}$ input and COMP as output. C3 is an integration capacitor for the control loop.

Typically, there is an internal voltage reference in the controller IC which is used as a control reference. The controller IC compares this internal reference with the external $V_{sense}$ signal to tightly control the output. For constant current control, $V_{sense}$ needs to be a current feedback signal that comes from the load.

However, the controller IC does not share the same ground as the output load, as shown in FIG. 1. As a result, an expensive isolated signal coupler is typically required to transfer the real current sensing signal from the output stage to the IC stage. Resistor R6 is the load current sensing resistor.

This isolated signal coupler is not only expensive, but also introduces error and complicates the control scheme. Therefore, it would be desirable to eliminate this type of isolated signal coupler in a buck-boost converter topology.

It would further be desirable to have a dimming control circuit that has the same ground as $GND_{main}$ so that only one dimming signal is required in order to control multiple channels of a buck-boost converter.

BRIEF SUMMARY OF THE INVENTION

The floating IC driven buck boost converter of the present invention will effectively solve this problem. The floating IC driven high power factor constant current buck-boost converter has a very compact size, simple control scheme, extremely low cost and high efficiency.

In one embodiment, a buck-boost LED driver circuit is provided with floating IC driving control. A DC power supply is provided with first and second inputs, the second input coupled to a mains ground. A PFC switching circuit is coupled to the first input and operable to drive an LED load. A current sensor is coupled to the switching circuit and configured to provide feedback signals representative of current through the LED load, and a dimming control circuit is coupled to the mains circuit ground and effectively superposes an external dimming control signal with the load feedback signal. A PFC controller is configured to provide driver signals to a switching element based on the superposed dimming and load feedback signals as compared to an internal reference. Each of the switching element, the current sensor and the controller are commonly coupled to a floating circuit ground.

DETAILED DESCRIPTION OF THE INVENTION

Figure 1:
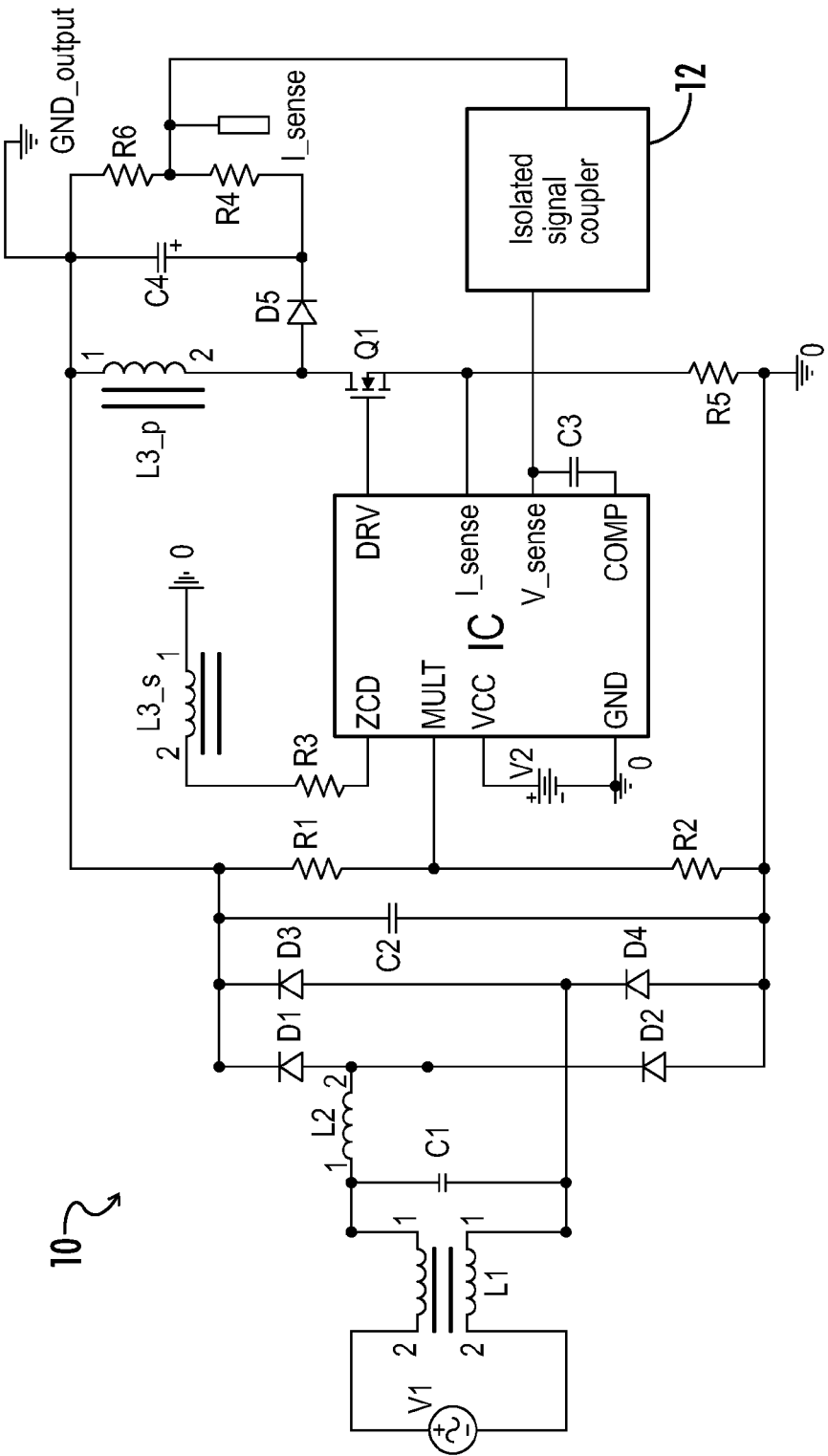
FIG. 1 is a circuit block diagram representing a high power factor constant current buck-boost converter as conventionally known in the art.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Figure 2:
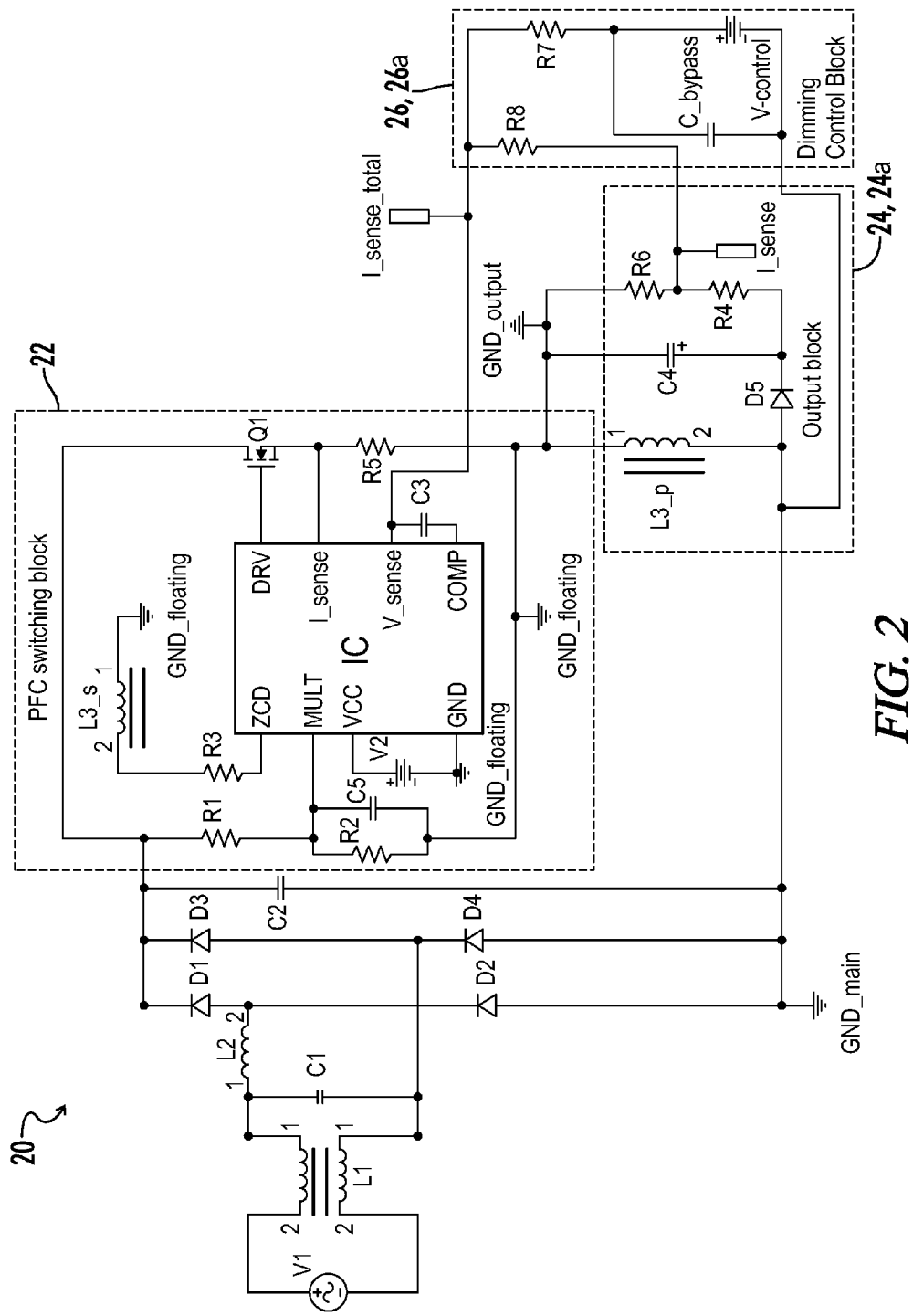
FIG. 2 is a circuit block diagram representing an embodiment of a power converter current control circuit topology according to the present invention.
Figure 3:
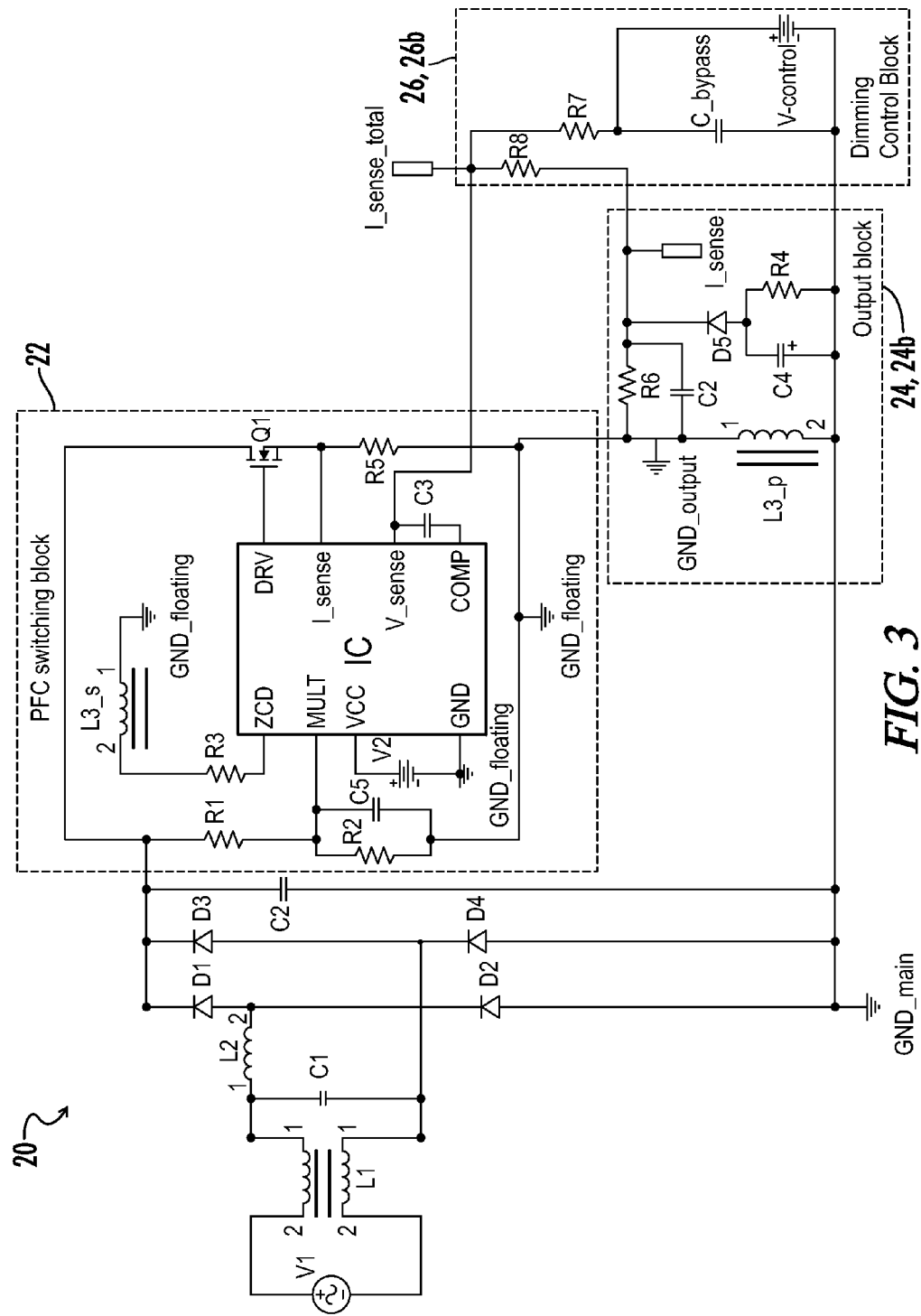
FIG. 3 is a circuit block diagram representing another embodiment of a power converter current control topology according to the present invention.
Figure 4:
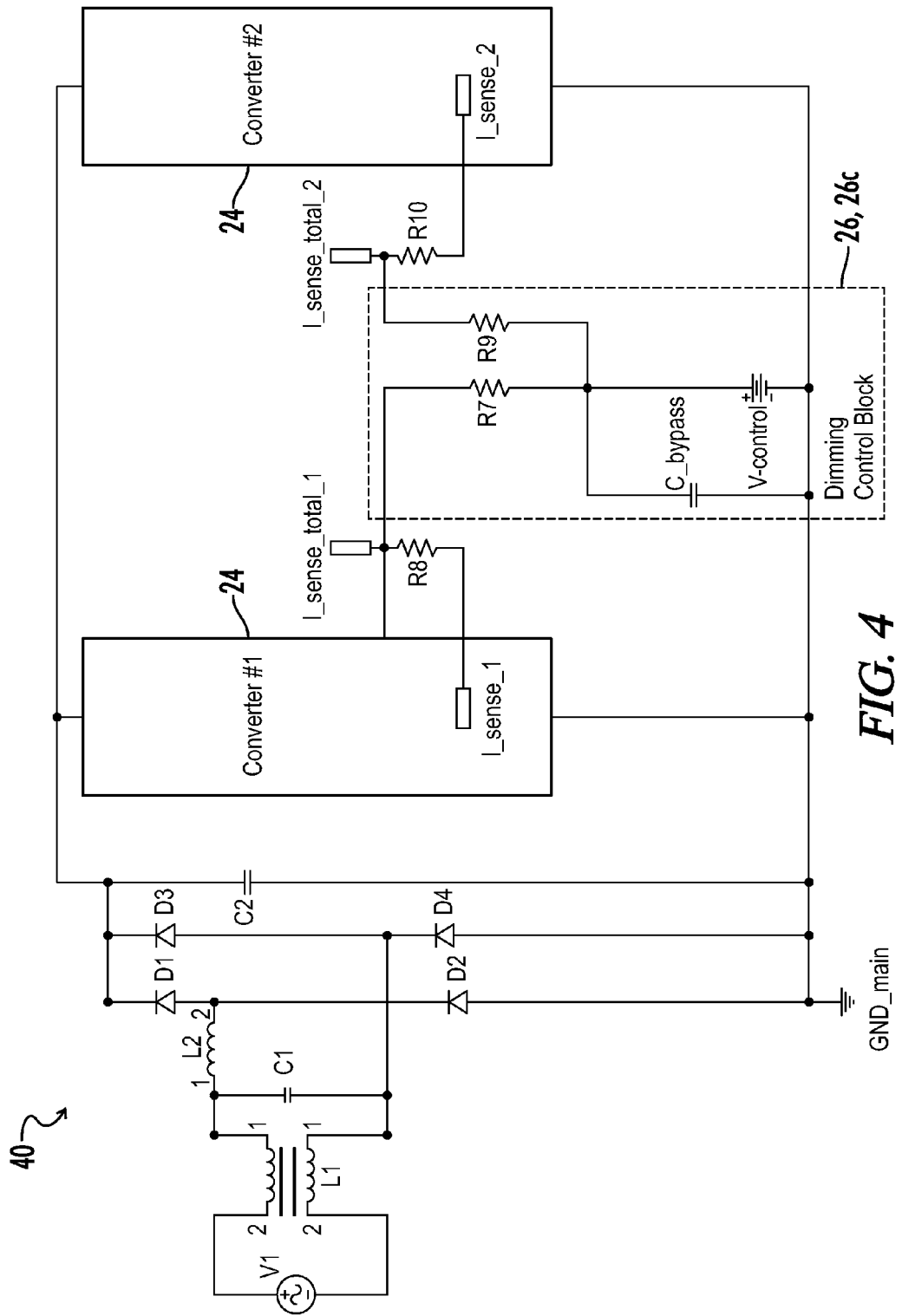
FIG. 4 is a circuit block diagram representing an embodiment of dimming current control system according to the present invention.

Referring generally to FIGS. 2-4, various embodiments of an LED driver circuit 20 as disclosed herein include an output block 24 rearranged so that it shares the same floating ground $GND_{floating}$ as a power factor correction (PFC) switching block 22, and further includes a dimming control block 26 using a main ground $GND_{main}$. Where the various figures may describe embodiments sharing various common elements and features with other embodiments, similar elements and features are given the same reference numerals and redundant description thereof may be omitted below.

Referring more particularly now to an embodiment as represented in FIG. 2, an LED driver 20 includes a PFC switching block 22 which has its own floating ground $GND_{floating}$. The entire output block 24a is connected in series with resistor R5 and switching element Q1, and has its own ground $GND_{output}$. However, electrically speaking $GND_{floating}$ and $GND_{output}$ are the same point.

Because the PFC switching block 22 and output block 24a share the same ground, the output current sensing signal $I_{sense}$ can be used to directly feedback to the controller IC for current regulation. No isolated signal coupler is needed for constant current control and the controller IC operations will be extremely simplified.

To ensure that the power factor correction controller IC functions correctly, the average voltage between controller IC ground ($GND_{floating}$) and mains ground ($GND_{main}$) must be zero in steady state, so that the low frequency voltage (input line frequency) at MULT pin (multiplier pin of power factor correction controller IC) is effectively proportional to the output of the input diode bridge rectifier D1-D4. The controller IC can therefore regulate the input current to follow the input voltage waveform to achieve its power factor correction goal.

Because the DC resistance is very small for a magnetic, the DC voltage across the primary winding $L3_p$ of the buck-boost inductor is zero in steady state operation. Therefore, the requirement discussed above (i.e., zero voltage across the controller IC ground and the mains ground) is satisfied in the exemplary circuit shown in both of FIGS. 2 and 3.

However, the high frequency voltage and the output voltage of the input diode rectifier bridge D1-D4 are superimposed across resistors R1 and R2. To filter out the high frequency noise across resistor R2, a high frequency noise filter capacitor C5 is connected in parallel with resistor R2 to filter out the high frequency noise coming from the primary winding $L3_p$ of the buck-boost inductor.

The LED driver 20 further includes a dimming control block 26a (FIG. 2). $V_{control}$ is a dimming control voltage that can be changed by an external dimming signal (not shown). A resistor R8 is added to the original current sensing circuit, in the present example coupled between the current sensing resistor R6 and the error amplifier input terminals of the controller IC. R8 and C3 form a low pass filter. As a result, the voltage across capacitor C3 ($V_{C3}$) may be provided as a relatively pure DC signal with respect to the $I_{sense}$ feedback signal, which might otherwise have some small AC signal component. Resistor R7 is provided within the dimming control block 26a to superpose the dimming control voltage $V_{control}$ on capacitor C3. The voltage on capacitor C3 follows the relation:

$$V_{c3} = I_{sense} \cdot \frac{R_7}{R_6 + R_7} + V_{control} \cdot \frac{R_6}{R_6 + R_7}$$

Current control is achieved in the controller IC by comparing the internal reference voltage to the total current sensing signal $I_{sense\_total}$:

$$V_{I\_ref\_IC\_internal} = I_{sense} \cdot \frac{R_7}{R_6 + R_7} + V_{control} \cdot \frac{R_6}{R_6 + R_7}$$

The voltage across capacitor C3 is the total current sensing signal $I_{sense\_total}$. When the dimming control voltage $V_{control}$ changes, it follows that the total feedback signal $I_{sense\_total}$ changes as well. When the dimming control voltage $V_{control}$ is zero, the total feedback signal $I_{sense\_total}$ is at its relative minimum value so that the output current will be at a relative maximum. When the dimming control voltage $V_{control}$ is at its maximum value, the total feedback signal $I_{sense\_total}$ is also at a relative maximum so that the output current will be at its relative minimum.

$C_{bypass}$ is a capacitor that is capable of filtering out the high frequency voltage across the dimming control block 26a. In the example shown, the high frequency voltage across the dimming control block 26a is the voltage across the primary winding $L3_p$ of the buck-boost inductor. The filter capacitor $C_{bypass}$ as shown may therefore effectively ensure that all the high frequency voltage will be provided across the resistor R7.

Referring next to an alternative topology for an LED driver 20 as represented in FIG. 3, the primary difference is that the current sensing position in the exemplary output block 24b shown is different. The current sensing signal in FIG. 2 is the real current signal, but the output is floating. The current sensing signal in FIG. 3 is the total current passing through the diode D5, but the AC current component is filtered out by capacitor C2 which is coupled in parallel with the sensing resistor R6, so that the DC component will be the same as the current going through the LED load R4.

One advantage for the topology represented in FIG. 3 is that the output has a reference point, which is the input diode bridge ground, $GND_{main}$. This topology could offer a better output current waveform and EMI result.

Otherwise, implementation of a dimming control block 26b in the embodiment represented in FIG. 3 is substantially identical to that as previously described.

Referring now to FIG. 4, a lighting control system 40 may implement the concepts as described herein with respect to multi-channel floating IC driven buck boost converters. As shown in FIG. 4, only one dimming control block 26c and corresponding dimming control voltage $V_{control}$ is need for two or more channels with floating IC driven buck-boost converters 24, since the current control circuit shares the same ground $GND_{main}$. It may be understood that a first buck-boost converter having PFC switching block and output block may be provided as shown with resistor R8, while one or more additional buck-boost converters including a second buck-boost converter having respective and otherwise equivalent PFC switching block and output block may be provided with additional respective resistors, e.g., R10, to provide the equivalent functionality as described above with respect to either of the previously disclosed embodiments in FIGS. 2 and 3.

The previous detailed description has been provided for the purposes of illustration and description. Thus, although there have been described particular embodiments of an invention, it is not intended that such references be construed as limitations upon the scope of this invention except as set forth in the following claims.

What is claimed is:

1. An LED driver circuit comprising:
   first and second DC input terminals, the second DC input terminal coupled to a first circuit ground;
   a PFC switching circuit block comprising a PFC controller and a switching element coupled on a first end to the first DC input terminal and on a second end to a second circuit ground;
   an output circuit block comprising
      a buck-boost inductor coupled on a first end to the first circuit ground and on a second end to the second circuit ground, and
      a first current sensor coupled on a first end to the second circuit ground; and
   a dimming control circuit block comprising a second current sensor coupled between a second end of the first current sensor and a feedback input terminal on the PFC controller, the dimming control circuit block further coupled to the second circuit ground.

2. The LED driver circuit of claim 1, the dimming control circuit block further comprising a resistor coupled between a dimming control voltage and the feedback input terminal of the PFC controller, the dimming control circuit block effective thereby to superpose the dimming control voltage with a voltage across the first current sensor.

3. The LED driver circuit of claim 2, the second current sensor in combination with an integration capacitor defining a low pass filter with respect to the feedback input terminal of the PFC controller.

4. The LED driver circuit of claim 2, the dimming control circuit block further comprising a bypass capacitor coupled in parallel with the dimming control voltage and effective to filter high frequency voltage across the dimming control circuit block.

5. The LED driver circuit of claim 2, wherein the PFC controller is configured to compare a feedback signal to a reference value to generate driving signals for the switching element, the feedback signal comprising the dimming control voltage superposed with the voltage across the first current sensor.

6. The LED driver circuit of claim 5, further comprising the LED load coupled on a first end to the second circuit ground and on a second end to a node between the first and second current sensors.

7. The LED driver circuit of claim 6, the output circuit block further comprising an output capacitor coupled in parallel with the LED load, and a diode coupled on a first end to the output capacitor and on a second end to the first current sensor.

8. The LED driver circuit of claim 7, the output circuit block further comprising a capacitor coupled in parallel with the current sensor, wherein an AC current component is filtered from the feedback current signal.

9. The LED driver circuit of claim 6, the output circuit block further comprising an output capacitor coupled in parallel with a series circuit comprising the LED load and the current sensor.

10. The LED driver circuit of claim 9, the output circuit block further comprising a diode coupled on a first end to the second circuit ground and on a second end to the output capacitor and the LED load.

11. An LED driving system comprising:
   first and second DC input terminals, the second DC input terminal coupled to a main circuit ground;
   a plurality of buck-boost LED driver circuits, each of the circuits respectively comprising a PFC switching circuit block comprising a switching element coupled on a first end to the first DC input terminal and on a second end to a floating circuit ground, an output circuit block comprising an inductor coupled on a first end to the main circuit ground and on a second end to the floating circuit ground, and a load current sensor coupled on a first end to the floating circuit ground, a resistance coupled between a second end of the load current sensor and a feedback input terminal on an associated PFC controller; and a dimming control circuit block comprising a dimming control voltage source coupled to the main circuit ground, and effective to superpose a dimming control voltage with a voltage across the respective load current sensor for each LED driver circuit.

12. The LED driving system of claim 11, each LED driver circuit further comprising a low pass filter with respect to the feedback input terminal of the PFC controller.

13. The LED driving system of claim 11, the dimming control circuit block further comprising a bypass capacitor coupled in parallel with the dimming control voltage source and effective to filter high frequency voltage across the dimming control circuit block.

14. The LED driving system of claim 11, wherein the PFC controller is configured to compare a feedback signal to a reference value to generate driving signals for the respective switching element, the feedback signal comprising the dimming control voltage superposed with the voltage across the respective load current sensor.

15. The LED driving system of claim 14, each LED driver circuit further comprising an LED load coupled on a first end to the respective floating ground and on a second end to a the load current sensor.

16. The LED driving system of claim 15, the output circuit block for each LED driver circuit further comprising an output capacitor coupled in parallel with the LED load, and a diode coupled on a first end to the output capacitor and on a second end to the load current sensor.

17. The LED driving system of claim 16, the output circuit block for each LED driver circuit further comprising a capacitor coupled in parallel with the load current sensor, wherein an AC current component is filtered from the respective feedback signal.

18. The LED driving system of claim 15, the output circuit block for each LED driver circuit further comprising an output capacitor coupled in parallel with a series circuit comprising the respective LED load and the load current sensor.

19. The LED driving system of claim 18, the output circuit block for each LED driver circuit further comprising a diode coupled on a first end to the respective floating circuit ground and on a second end to the output capacitor and the LED load.

20. A method of driving an LED load, the method comprising:
providing a DC voltage supply having a first input voltage and a second input voltage coupled to a main circuit ground;
providing a feedback signal representative of the actual current through an LED load coupled to a floating circuit ground;
providing an external dimming control signal via a dimming control voltage source coupled to a main circuit ground;
superposing the feedback signal and the dimming control signal to generate a total signal;
comparing the total signal to a voltage reference associated with a controller coupled to the floating ground; and
generating driving signals to operate a switching element for providing current to the LED load.

* * * * *